(12) United States Patent
Wang

(10) Patent No.: US 12,372,432 B2
(45) Date of Patent: Jul. 29, 2025

(54) SUPPORT DEVICE FOR FLEXIBLE PLATE STRUCTURE

(71) Applicant: BOE Technology Group Co., Ltd., Beijing (CN)

(72) Inventor: Yanming Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 615 days.

(21) Appl. No.: 17/784,459

(22) PCT Filed: Jul. 5, 2021

(86) PCT No.: PCT/CN2021/104548
§ 371 (c)(1),
(2) Date: Jun. 10, 2022

(87) PCT Pub. No.: WO2022/042047
PCT Pub. Date: Mar. 3, 2022

(65) Prior Publication Data
US 2023/0003613 A1 Jan. 5, 2023

(30) Foreign Application Priority Data
Aug. 31, 2020 (CN) .......................... 202010895642.8

(51) Int. Cl.
*G02B 26/08* (2006.01)
*G01D 11/30* (2006.01)
*G01M 11/02* (2006.01)

(52) U.S. Cl.
CPC ......... *G01M 11/0214* (2013.01); *G01D 11/30* (2013.01)

(58) Field of Classification Search
CPC .... G01M 11/0214; G01D 11/30; G02B 26/08
See application file for complete search history.

(56) References Cited

U.S. PATENT DOCUMENTS

| 2013/0070431 | A1* | 3/2013 | Fukuma | ................ G06F 1/1652 |
| | | | | 428/156 |
| 2018/0103551 | A1* | 4/2018 | Park | ..................... H05K 5/0217 |
| 2021/0120688 | A1 | 4/2021 | Wang | |
| 2021/0178729 | A1 | 6/2021 | Tang | |

FOREIGN PATENT DOCUMENTS

| CN | 103021277 A | 4/2013 |
| CN | 104729766 A | 6/2015 |
| CN | 204516278 U | 7/2015 |
| CN | 108399861 A | 8/2018 |
| CN | 108847139 A | 11/2018 |
| CN | 208806014 U | 4/2019 |
| CN | 111811559 A | 10/2020 |
| CN | 212658283 U | 3/2021 |

* cited by examiner

*Primary Examiner* — Euncha P Cherry
(74) *Attorney, Agent, or Firm* — IPro, PLLC

(57) ABSTRACT

Provided is a support device. The support device includes a base; a support rod, disposed on the base; a plurality of contact rods, being parallel to the support rod and arranged in an arc around the support rod, wherein side faces of the plurality of contact rods provide a support surface for supporting the flexible plate structure; and a regulation structure, connected to the support rod and the contact rod, wherein the regulation structure is configured to regulate a distance between the contact rod and the support rod to regulate a bending curvature of the support surface.

19 Claims, 9 Drawing Sheets

SUPPORT DEVICE FOR FLEXIBLE PLATE STRUCTURE

CORRS-REFERENCE TO RELATED APPLICATION

The present disclosure is a U.S. national stage of international application No. PCT/CN2021/104548, field on Jul. 5, 2021, which claims priority to Chinese Patent Application No. 202010895642.8, filed on Aug. 31, 2020 and entitled "SUPPORT DEVICE FOR FLEXIBLE PLATE STRUCTURE," the contents of which are herein incorporated by reference in their entireties.

TECHNICAL FIELD

The present disclosure relates to the field of regulation, and in particular, relates to a support device for a flexible plate structure.

BACKGROUND

For some flexible plate-shaped structures, such as bendable display devices, performance of the flexible plate structure under different bending curvatures needs to be detected.

SUMMARY

Embodiments of the present disclosure provide a support device for a flexible plate structure.

The support device includes: a base; a support rod, disposed on the base; a plurality of contact rods, being parallel to the support rod, wherein the plurality of contact rods are arranged in an arc around the support rod, and side faces of the plurality of contact rods provide a support surface for supporting the flexible plate structure; and a regulation structure, connected to the support rod and the contact rod, wherein the regulation structure is configured to regulate a distance between the contact rod and the support rod to regulate a bending curvature of the support surface.

In some embodiments, the regulation structure includes: two hinge rings, spaced apart on the support rod, wherein at least one of the two hinge rings is configured to be movably disposed on the support rod, and a moving direction of the hinge ring is consistent with a length direction of the support rod; a plurality of first connection rods in one-to-one correspondence to the plurality of contact rods, wherein one end of the first connection rod is hinged to a corresponding contact rod, and the other end of the first connection rod is hinged to one of the two hinge rings; and a plurality of second connection rods in one-to-one correspondence to the plurality of contact rods, wherein one end of the second connection rod is hinged to a corresponding contact rod, and the other end of the second connection rod is hinged to the other of the two hinge rings.

In some embodiments, the two hinge rings are both movably sleeved on the support rod; and the regulation structure further includes: two regulation rings, spaced apart on the support rod and threaded to the support rod, wherein the two hinge rings are disposed between the two regulation rings; and a limit element, disposed on the support rod, wherein the limit element is configured to limit a position of the hinge ring on the support rod.

In some embodiments, the limit element is a first elastic element, wherein two ends of the first elastic element are abutted against the two hinge rings respectively, and the first elastic element is in a state of supplying a pressing force to the abutted hinge rings.

In some embodiments, the two hinge rings are moveably sleeved on the support rod; and the regulation structure includes: a telescopic sleeve, sleeved on the support rod, wherein a telescopic direction of the telescopic sleeve is consistent with the length direction of the support rod; wherein the two hinge rings are fixedly connected to opposite ends of the sleeve respectively.

In some embodiments, the support device further includes: an anti-rotation structure, disposed on the base, wherein the anti-rotation structure is abutted against the side face of at least one of the contact rods, and the anti-rotation structure is configured to prevent the plurality of contact rods from rotating around the support rod.

In some embodiments, the support rod is slidably disposed on the base; and the anti-rotation structure includes: a baffle, including a surface parallel to a length direction of the contact rod; and a pressing element, configured to limit a position of the support rod on the base, such that the side face of at least one of the contact rods is abutted against the surface of the baffle.

In some embodiments, the surface of the baffle is provided with a strip-shaped groove, wherein an extension direction of the strip-shaped groove is parallel to the length direction of the contact rod, and at least one of the contact rods is disposed inside the strip-shaped groove.

In some embodiments, the base includes two parallel linear guideways, wherein two ends of the support rod are slidably connected to the two linear guideways respectively.

In some embodiments, the linear guideways are fixation rods, wherein the two ends of the support rod are both provided with a through-hole arranged along a length direction of the linear guideway, and the two fixation rods pass through the two through-holes respectively.

In some embodiments, the pressing element is a second elastic element, wherein the second elastic element is disposed on the linear guideway, and the second elastic element is abutted against the support rod, and the second elastic element is in a state of supplying a pressing force to the abutted support rod.

In some embodiments, the base includes two opposite baseplates and two opposite support plates, wherein two ends of the two support plates are fixedly connected to the two baseplates respectively, wherein the two ends of the support rod are connected to the two support plates respectively.

In some embodiments, a length of the contact rod is from 5 cm to 10 cm.

In some embodiments, the plurality of contact rods are equally spaced around the support rod in a circular array.

In some embodiments, a number of the contact rods is from 15 to 30.

BRIEF DESCRIPTION OF THE DRAWINGS

For clearer descriptions of the technical solutions in the embodiments of the present disclosure, the following briefly introduces the accompanying drawings to be required in the descriptions of the embodiments. Apparently, the accompanying drawings in the following description show merely some embodiments of the present disclosure, and persons of ordinary skills in the art may still derive other drawings from these accompanying drawings without creative efforts.

DETAILED DESCRIPTION

The present disclosure is described in further detail with reference to the accompanying drawings, to clearly present the objects, technical solutions, and advantages of the present disclosure.

In a detection process, it is necessary to support a flexible plate structure by a support device, and the flexible plate structure has a bending curvature.

In the related art, the support device is provided with a support surface for supporting the flexible plate structure, and the bending curvature of the support surface of each support device is constant. For detection of the performance of the flexible plate structure under different bending curvatures, a plurality of support devices corresponding to different bending curvatures are desired, which is costly. Moreover, converting the flexible plate structure between the plurality of support devices is cumbersome and time-consuming.

Figure 1:
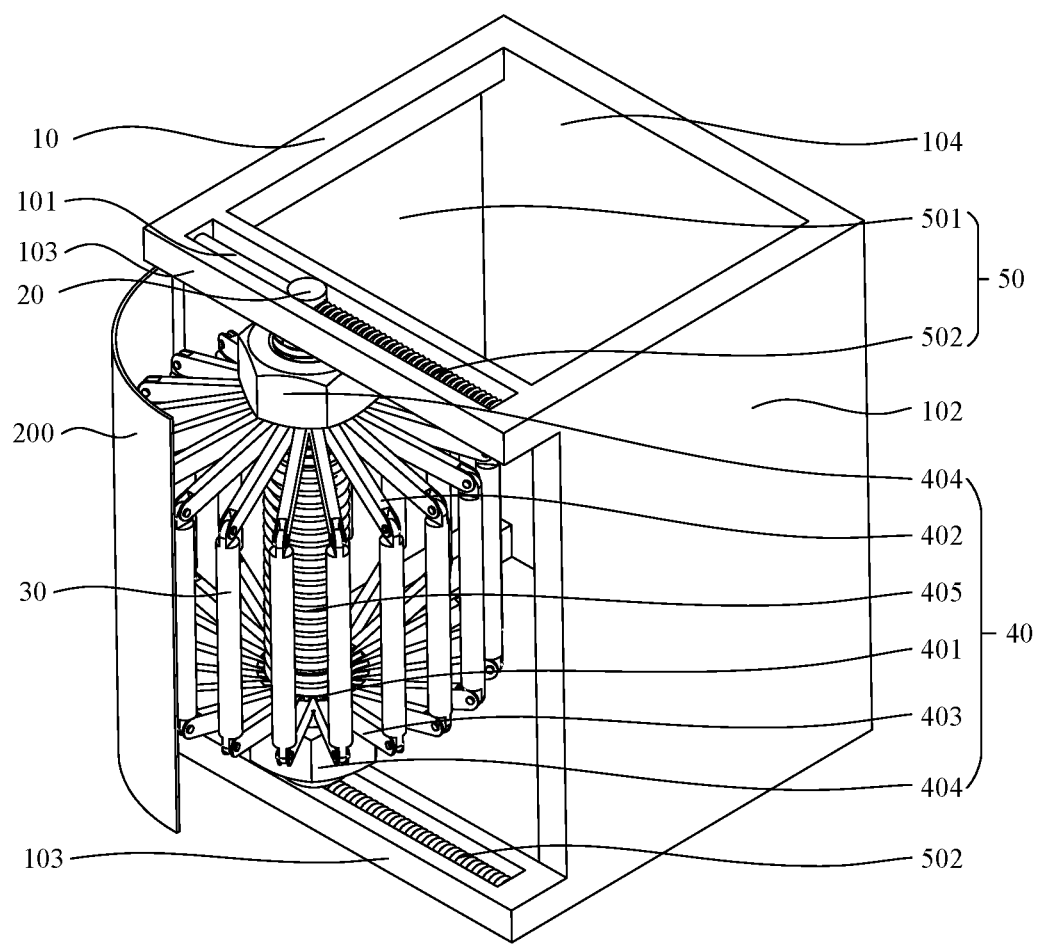
FIG. 1 is a schematic structural diagram of a support device according to an embodiment of the present disclosure.

FIG. 1 is a schematic structural diagram of a support device according to an embodiment of the present disclosure. Referring to FIG. 1, the support device includes: a base 10, a support rod 20, a plurality of contact rods 30, and a regulation structure 40. The support rod 20 is disposed on the base 10. The plurality of contact rods 30 are parallel to the support rod 20 and arranged in an arc around the support rod 20, wherein side faces of the plurality of contact rods 30 provide a support surface for supporting the flexible plate structure 200. The regulation structure 40 is connected to the support rod 20 and the contact rod 30, wherein the regulation structure 40 is configured to regulate a distance between the contact rod 30 and the support rod 20 to regulate a bending curvature of the support surface. The regulation structure 40 may regulate a minimum distance between the contact rod 30 and the support rod 20, or regulate a distance between a central line of the contact rod 30 and a central line of the support rod 20.

In the embodiments of the present disclosure, the plurality of contact rods 30 are parallel to the support rod 20 and arranged in an arc around the support rod 20, wherein side faces of the plurality of contact rods 30 may form an approximately arc-shaped support surface for supporting the flexible plate structure 200. A central line of the support rod 20 is a central line of the support surface, and a sum of a radius of the support rod 20, a minimum distance between the contact rod 30 and the support rod 20, and a diameter of the contact rod 30 is a radius of the support surface. The radius of the support surface is negatively correlated with the bending curvature of the support surface, that is, the greater the radius of the support surface, the smaller the bending curvature of the support surface, and the smaller the radius of the support surface, and the greater the bending curvature of the support surface. Thus, the bending curvature of the support surface may be regulated by regulating the minimum distance between the contact rod 30 and the support rod 20 by the regulation structure 40. In the process of detecting the performance of the flexible plate structure 200 under different bending curvatures, the flexible plate structure 200 is attached to the support surface, and the bending curvature of the support surface is equal to the bending curvature of the flexible plate structure 200. Therefore, in the process of detecting the performance of the flexible plate structure 200 under different bending curvatures, the support device may support the flexible plate structure 200 under different bending curvatures, and thus the cost is reduced. Further, in the detection process, it is not necessary to replace the support device, which improves the work efficiency.

In the embodiments of the present disclosure, in the case that the flexible plate structure 200 is attached to the support surface, the flexible plate structure 200 may be pasted on the contact rod 30, such that the stability of the flexible plate structure 200 in the detecting process is ensured, and accuracy of the detection is prevented from being affected.

In the embodiments of the present disclosure, the central line of the contact rod 30 is parallel to the central line of the support rod 20.

Figure 2:
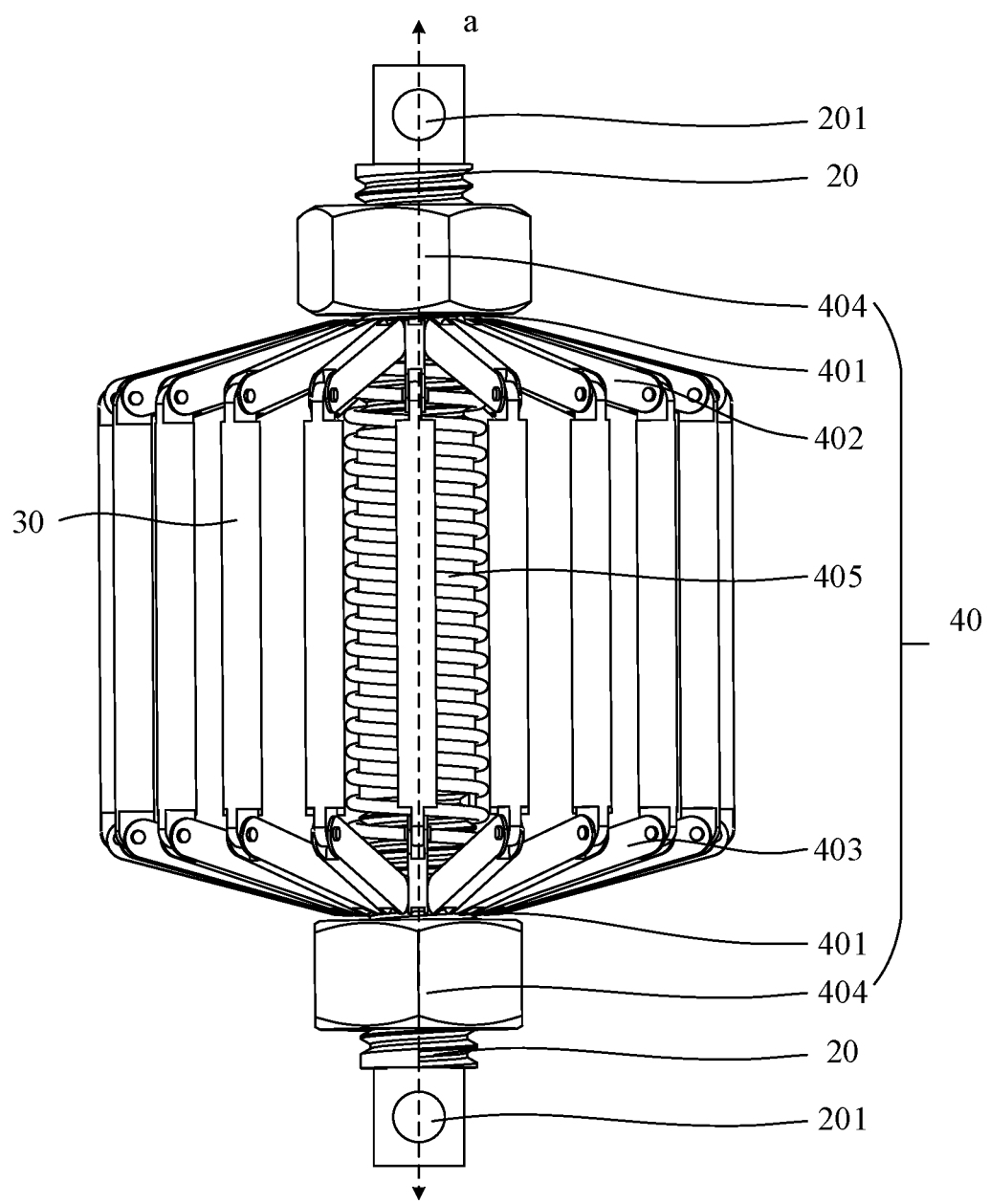
FIG. 2 is a schematic composite diagram of a support rod, a contact rod and a regulation structure according to an embodiment of the present disclosure.

FIG. 2 is a schematic composite diagram of a support rod, a contact rod, and a regulation structure according to an embodiment of the present disclosure. Referring to FIGS. 1 and 2, the regulation structure 40 includes two hinge rings 401, a plurality of first connection rods 402, and a plurality of second connection rods 403. Two hinge rings 401 are spaced apart on the support rod 20, wherein at least one of the two hinge rings 401 is configured to be movably disposed on the support rod 20, and a moving direction of the hinge ring 401 is consistent with a length direction a of the support rod 20. The plurality of first connection rods 402 are in one-to-one correspondence to the plurality of contact rods 30, wherein one end of the first connection rod 402 is hinged to the corresponding contact rod 30, and the other end of the first connection rod 402 is hinged to one of the two hinge rings 401. The plurality of second connection rods 403 are in one-to-one correspondence to the plurality of contact rods 30, wherein one end of the second connection rod 403 is hinged to the corresponding contact rod 30, and the other end of the second connection rod 403 is hinged to the other of the two hinge rings 401.

Because the first connection rod 402 is hinged to one of the two hinged rings 401, the first connection rod 402 is hinged to the contact rod 30, the contact rod 30 is hinged to the second connection rod 403, the second connection rod 403 is hinged to the other of the two hinged rings 401, and at least one of the two hinged rings 401 is movable along the length direction a of the support rod 20. In the case that the bending curvature of the support surface needs to be regulated, the position of at least one of the two hinge rings 401 on the support rod 20 is regulated, such that a distance between the two hinge rings 401 changes, and the first connection rod 402 and the second connection rod 403 rotate around the hinge shaft, and thus an angle between the first connection rod 402 and the support rod 20 and an angle between the second connection rod 403 and the support rod 20 change. In this way, the distance between the contact rod 30 and the support rod 20 is changed, and thus the radius of the support surface is regulated. In the process of detecting the performance of the flexible plate structure 200 under different bending curvatures, it is convenient to regulate the bending curvature of the flexible plate structure 200.

Exemplarily, in the embodiment shown in FIG. 2, the two hinge rings 401 are both movably disposed on the support rod 20. The regulation structure 40 further includes: two regulation rings 404 and a limit element 405. The two regulation rings 404 are spaced apart on the support rod 20, and threaded to the support rod 20, wherein the two hinge rings 401 are disposed between the two regulation rings 404. The limit element 405 is disposed on the support rod 20, and the limit element 405 is configured to limit the position of the hinge ring 401 on the support rod 20.

The regulation ring 404 is threaded to the support rod 20, and a distance between the two regulation rings 404 may be regulated by rotating the regulation rings 404. Because the hinge ring 401 is disposed between the two regulation rings 404, in the case that the regulation ring 404 is in contact with the hinge ring 401, the position of the hinge ring 401 on the support rod 20 is changed during the movement of the regulation ring 404. At the same time, the limit element 405 is configured to limit the position of the hinge ring 401 on the support rod 20, and the distance between the two hinge rings 401 is maintained constant upon regulation of the position of the hinge ring 401, such that the distance between the contact rod 30 and the support rod 20 is maintained constant. In the process of detecting the performance of the flexible plate structure 200 under different bending curvatures, the radius of the support surface may not be changed, the bending curvature of the flexible plate structure 200 may not be affected, and detection results are prevented from being affected.

The first connection rod 402 and the second connection rod 403 are both hinged to the hinge rings 401. The angle between the first connection rod 402 and the support rod 20, and the angle between the second connection rod 403 and the support rod 20 are changed in the case that the distance between the two hinge rings 401 changes, such that the radius of the support surface is regulated. In the process of detecting the performance of the flexible plate structure 200 under different bending curvatures, it is more convenient to regulate the bending curvature of the flexible plate structure 200 by rotating the regulation ring 404.

As illustrated in FIG. 2, the support rod 20 is provided with an external thread, and the regulation ring 404 is provided with an internal thread, such that a thread connection is achieved between the regulation ring 404 and the support rod 20.

In some embodiments, two ends of the support rod 20 are both provided with external threads, and the two regulation rings 404 are both provided with internal threads, and the two regulation rings 404 are threaded to the support rod 20, such that the distance between the two hinge rings 401 may be regulated by both the two regulation rings 404.

In some embodiments, one end of the support rod 20 is provided with the external thread, and one of the two regulation rings 404 is provided with the internal thread, such that the thread connection is achieved by the regulation ring 404 with the internal thread and one end of the support rod 20 with the external thread. The other of the two regulation rings 404 is fixed to the other end of the support rod 20, and the distance between the two hinge rings 401 is regulated by one of the two regulation rings 404.

For example, in the vertical direction, an upper end of the support rod 20 is provided with the external thread, and the thread connection is achieved by the regulation ring 404 with the internal thread and the upper end of the support rod 20 with the external thread. The other of the two regulation rings 404 is fixed to a lower end of the support rod 20.

In some embodiments, the limit element 405 is a first elastic element, wherein two ends of the first elastic element are abutted against the two hinge rings 401 respectively, and the first elastic element is in a state of supplying a pressing force to the abutted two hinge rings 401.

The first elastic element is disposed between the two hinge rings 401, and the first elastic element generates a force towards the regulation ring 404 on the hinge ring 401. Due to the thread connection between the regulation ring 404 and the support rod 20, the regulation ring 404 limits a movement of the hinge ring 401 away from the first elastic element. The position of the hinge ring 401 is limited by the first elastic element and the regulation ring 404.

In some embodiments, the first elastic element is a first compression spring in a compressed state. It is more convenient that the first compression spring supplies the pressing force to the hinge ring 401. Meanwhile, the cost of producing the support device for the flexible plate structure is reduced because the compression spring is easy to obtain.

In some embodiments, the first elastic element also may be a first spring piece in a compressed state, wherein the first spring piece may supply the pressing force to the hinge ring 401 likewise.

In some embodiments, the distance between the two hinge rings 401 may be limited in other ways. Such as, the support rod 20 is provided with a plurality of through-holes, wherein extension directions of the plurality of through-holes are perpendicular to the length direction a of the support rod 20. The hinge ring 401 is regulated between the two through-holes, and then pins are inserted into the two though-holes respectively to limit the distance between the two hinge rings 401.

Figure 3:
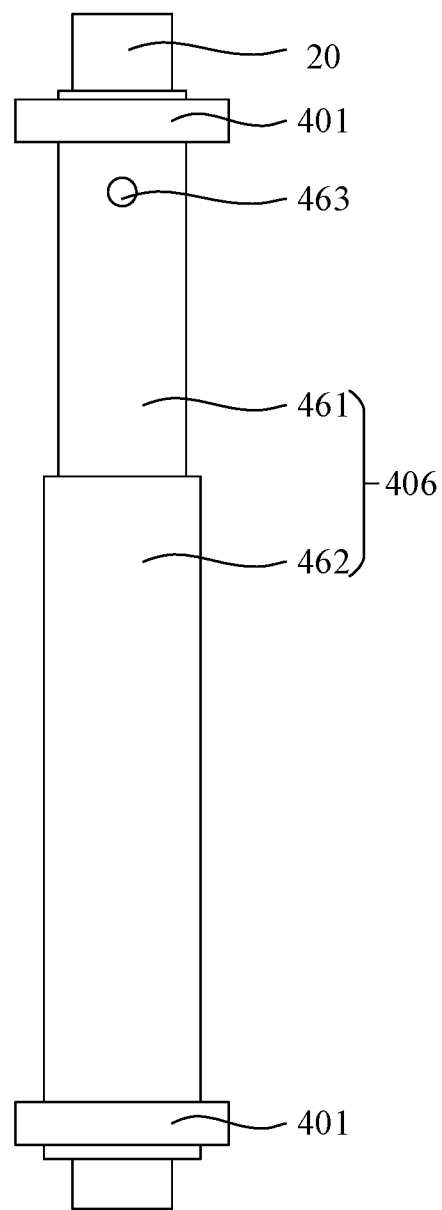
FIG. 3 is a schematic composite diagram of a sleeve and a support rod according to an embodiment of the present disclosure.

In some embodiments, the regulation structure 40 includes a telescopic sleeve 406. FIG. 3 is a schematic composite diagram of a telescopic sleeve and a support rod according to an embodiment of the present disclosure. Referring to FIG. 3, the sleeve 406 is sleeved on the support rod 20, wherein a telescopic direction of the sleeve 406 is consistent with the length direction of the support rod 20. The two hinge rings 401 are fixedly connected to the two ends of the sleeve 406 respectively. In the detection process, a telescopic length of the telescopic sleeve 406 is regulated, such that the distance between the two hinge rings 401 is regulated.

Exemplarily, the telescopic sleeve 406 includes a first tube body 461 and a second tube body 462, wherein the first tube body 461 and the second tube body 462 are both sleeved on the support rod 20 coaxially, and one end of the first tube body 461 is disposed inside the second tube body 462, and one end of the second tube body 462 away from the first tube body 461 is fixedly connected to the support rod 20. The first tube body 461 is provided with a plurality of tube-body through-holes 463, and the support rod 20 is provided with a plurality of through-holes, wherein extension directions of the tube-body through-holes 463 and the through-holes on the support rod 20 are both perpendicular to the length direction a of the support rod 20. In regulating the telescopic length of the sleeve 406, a position of one end of the first tube body 461 inside the second tube body 462 is regulated. At the same time, a tube-body through-hole 463 on the first tube body 461 is connected to a through-hole of the support rod 20, and then a pin is inserted into the tube-body through-hole 463 and the through-hole of the support rod 20 to fix the first tube body 461, such that the telescopic length of the sleeve 406 is regulated, that is, the distance between the two hinge rings 401 is regulated.

Figure 4:
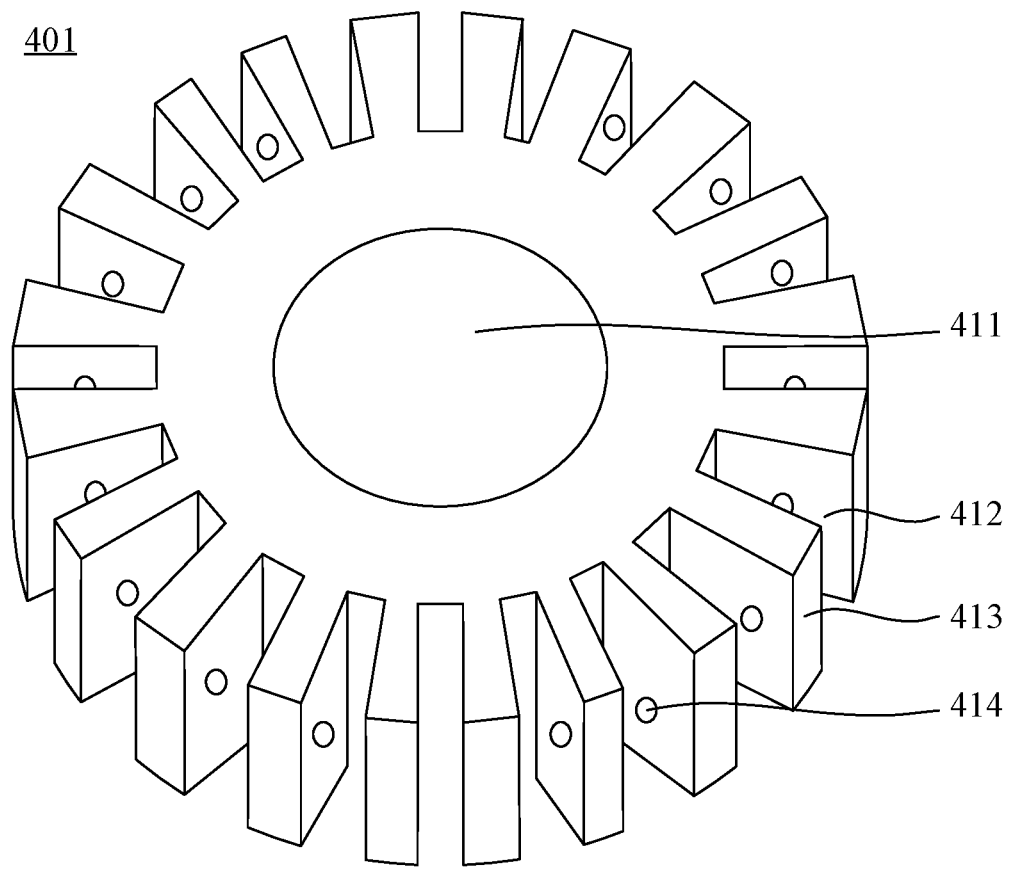
FIG. 4 is a schematic structural diagram of a hinge ring according to an embodiment of the present disclosure.

FIG. 4 is a schematic structural diagram of a hinge ring according to an embodiment of the present disclosure. Referring to FIG. 4, the hinge ring 401 is circular ring shaped, and a center of the hinge ring 401 is provided with a through-hole 411 of the hinge ring 401 that penetrates through the upper and lower end faces of the hinge ring 401. The support rod 20 passes through the through-hole 411 of the hinge ring 401, such that the hinge ring 401 is sleeved on the support rod 20. An outer circle side wall of the hinge ring 401 is provided with a plurality of hinge blocks 413, and the plurality of hinge blocks 413 are equally spaced apart around the through-hole 411 of the hinge ring 401. A gap 412 is formed between each two adjacent hinge blocks 413. The hinge block 413 is provided with a through-hole 414 of the hinge block 413, and the hinge blocks 413 is in one-to-one correspondence to the contact rods 30.

Figure 5:
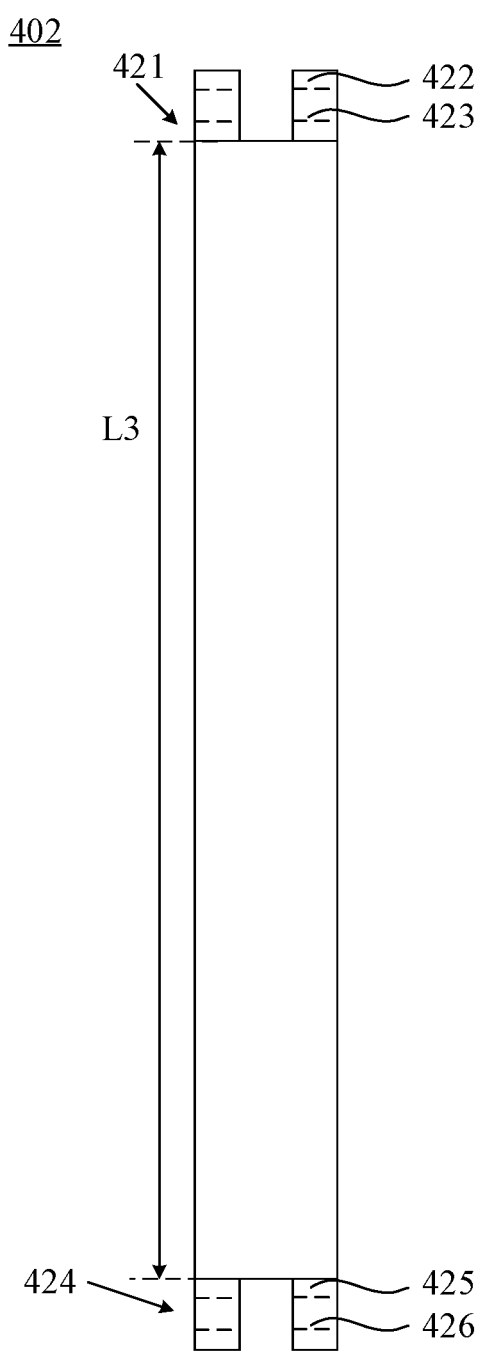
FIG. 5 is a schematic structural diagram of a first connection rod according to an embodiment of the present disclosure.

FIG. 5 is a schematic structural diagram of a first connection rod according to an embodiment of the present disclosure. Referring to FIG. 5, one end 421 of the first connection rod 402 is provided with two first ear plates 422 spaced apart, and the two first ear plates 422 are respectively provided with two first ear plate through-holes 423 perpendicular to a length direction of the first connection rod 402, wherein central lines of the two first ear plate through-holes 423 are on the same straight line. A gap between the two first ear plates 422 is greater than the thickness of the hinge block 413.

The hinge block 413 is placed in the gap between the two first ear plates 422, and the central line of the two first ear plate through-holes 423 and a central line of the through-hole 414 of the hinge block 401 are placed on the same straight line, and then a hinge shaft passes through the first ear plate through-hole 423, the through-hole 414 of the hinge block 401, and the first ear plate through-hole 423 in sequence, such that the first connection rod 402 is hinged to the hinge ring 401. The gap between the two first ear plates 422 is greater than the thickness of the hinge block 413, which facilitates rotation of one end 421 of the first connection rod 402.

The other end 424 of the first connection rod 402 is provided with two second ear plates 425 spaced apart, and the two second ear plates 425 are respectively provided with two second ear plate through-holes 426 perpendicular to the length direction of the first connection rod 402, wherein central lines of the two second ear plate through-holes 426 are on the same straight line.

Figure 6:
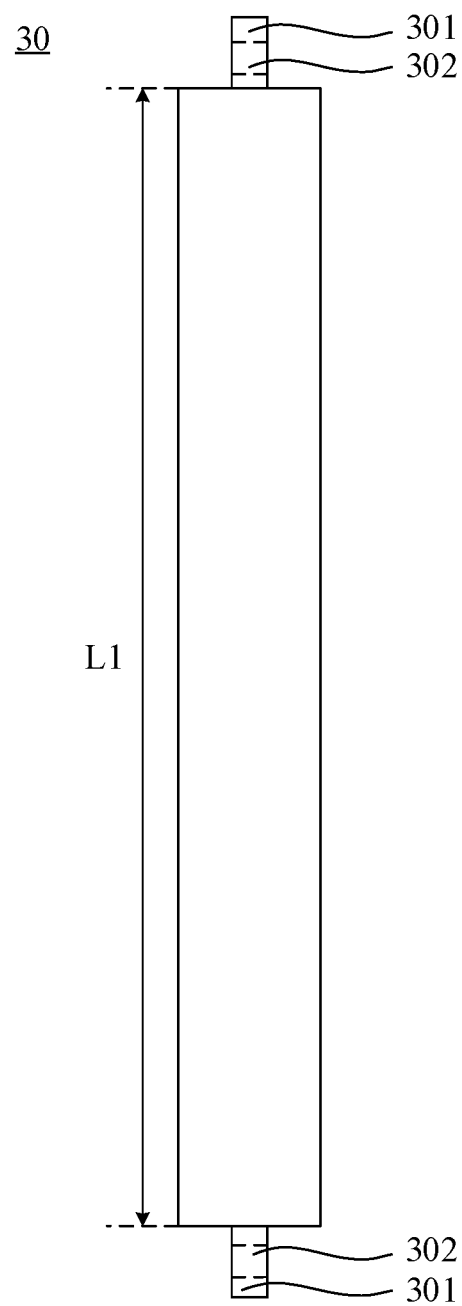
FIG. 6 is a schematic structural diagram of a contact rod according to an embodiment of the present disclosure.

FIG. 6 is a schematic structural diagram of a contact rod according to an embodiment of the present disclosure. Referring to FIG. 6, two ends of the contact rod 30 are respectively provided with two third ear plates 301, and the two third ear plates 301 are respectively provided with two third ear plate through-holes 302 perpendicular to a length direction of the contact rod 30. The third ear plate 301 is disposed in the gap between the two second era plates 425, and the hinge shaft passes through the second ear plate through-hole 426, the third ear plate through-hole 302, and the second ear plate through-hole 426 in sequence. A diameter of the hinge shaft is smaller than the second ear plate through-hole 426 and the third ear plate through-hole 302, such that the first connection rod 402 and the contact rod 30 may both rotate around the hinge shaft. In this way, the first connection rod 402 is hinged to the contact rod 30.

In the embodiments of the present disclosure, the second connection rod 403 may be threaded to the hinge ring 401 and the contact rod 30 in the same way.

In some embodiments, a length L1 of the contact rod 30 is from 5 cm to 10 cm.

In the embodiments of the present disclosure, the flexible plate structure 200 may be used as a detection device for detecting a pixel luminescent effect. The detection device is a small display panel, and by detecting the detection device to determine the pixel luminescent effect, the pixels with better luminescent effect are applied to the display panel, which ensures a display effect of the display panel subsequently manufactured. A size of the detection device is small. The length L1 of the contact rod 30 is limited to ensure that a size of the support surface formed by the contact rod 30 is sufficient to support the detection device, and ensure the accuracy of the detection.

In the case that the support device is employed to support the detection device for detecting the pixel luminescent effect, the detection device is provided with a luminescent region, and the length L1 of the contact rod 30 should be greater than a width of the luminescent region in the detection device, such that all display devices in the luminescent region are bendable, in detecting the performance of the detection device under different bending curvatures, which ensures the accuracy of the detection.

In some embodiments, the support device may be amplified in equal proportion, such that the support device supports a large-sized flexible plate structure.

In the embodiments of the present disclosure, a length of the support rod 20 is longer than the length of the contact rod 30, and a length of the first connection rod 402 is equal to a length L3 of the second connection rod 403.

Figure 7:
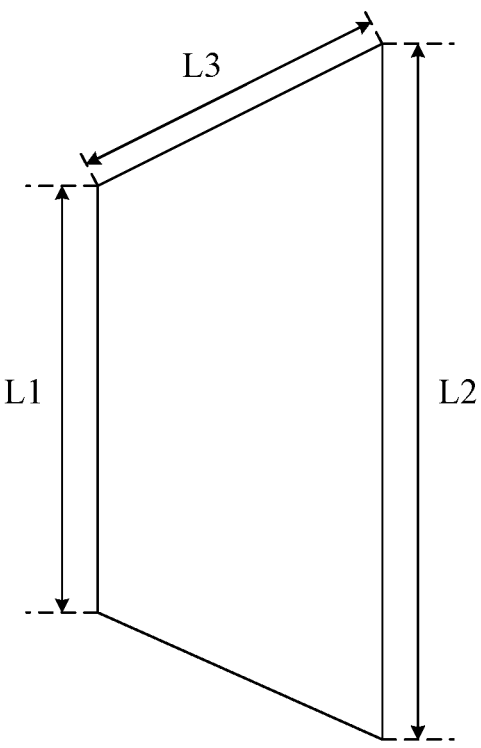
FIG. 7 is a schematic simplified diagram of connections of a support rod, a contact rod, a first connection rod, and a second connection rod according to an embodiment of the present disclosure.

FIG. 7 is a schematic simplified diagram of connections of a support rod, a contact rod, a first connection rod, and a second connection rod according to an embodiment of the present disclosure. Referring to FIG. 7, the contact rod 30, the first connection rod 402, the second connection rod 403, and the support rod 20 form an isosceles trapezoid. The contact rod 30 and the support rod 20 are top and bottom edges of the isosceles trapezoid respectively, and the first connection rod 402 and the second connection rod 403 are waists of the isosceles trapezoid respectively.

The minimum distance X between the support rod 20 and the contact rod 30 may be calculated by the Pythagorean theorem:

$$X = \sqrt{(L3)^2 - \frac{(L2-L1)^2}{4}}$$

L1 represents the length of the contact rod 30. L2 represents a minimum distance between the two hinge rings 401. L3 represents the length of the first connection rod 402.

The sum of the radius of the support rod 20, the minimum distance between the support rod 20 and the contact rod 30, and the diameter of the contact rod 30 is the radius of the support surface, that is, a bending radius of the flexible plate structure 200 attached to the support surface. The bending curvature of the flexible plate structure 200 may be derived according to a relationship between the bending radius and the bending curvature.

In some embodiments, the length of the first connection rod 402 may also be unequal to the length of the second connection rod 403.

Referring to FIG. 1 again, the support device includes an anti-rotation structure 50, wherein the anti-rotation structure 50 is abutted against the side face of at least one of the contact rods 30, and the anti-rotation structure 50 is configured to prevent the plurality of contact rods 30 from rotating around the support rod 20.

In the embodiments of the present disclosure, because the contact rods 30 are arranged in an arc around the support rod 20, in the process of detecting the performance of the flexible plate structure 200 under different bending curvatures, the contact rod 30 may rotate around the support rod 20, causing the flexible plate structure 200 rotates. The anti-rotation structure 50 is disposed, and the anti-rotation structure 50 is abutted against the side face of at least one of the contact rods 30 to prevent the plurality of contact rods 30 from rotating around support rod 20. In this way, the stability of the flexible plate structure 200 is ensured in the process of detecting the performance of the flexible plate structure 200 under different bending curvatures, and detection results are prevented from being affected by the rotation of the flexible plate structure 200.

Still referring to FIG. 1, the support rod 20 is slidably disposed on the base 10. The anti-rotation structure 50 includes a baffle 501 and a pressing element 502. The baffle 501 includes a surface parallel to the length direction of the contact rod 30. The pressing element 502 is configured to limit the position of the support rod 20 on the base 10, such that the side face of at least one of the contact rods 30 is abutted against the surface of the baffle 501.

In the embodiments of the present disclosure, in the process of detecting the performance of the flexible plate structure 200 under different bending curvatures, the pressing element 502 generates a pressing force on the support rod 20 to move the support rod 20, which drives the contact rod 30 move, such that the contact rod 30 is abutted against the surface of the baffle 501. Rotation of the contact rod 30 is prevented by friction between the side face of the contact rod 30 and the surface of the baffle 501.

In some embodiments, a sliding direction of the support rod 20 is perpendicular to the length direction of the support rod 20.

Figure 8:
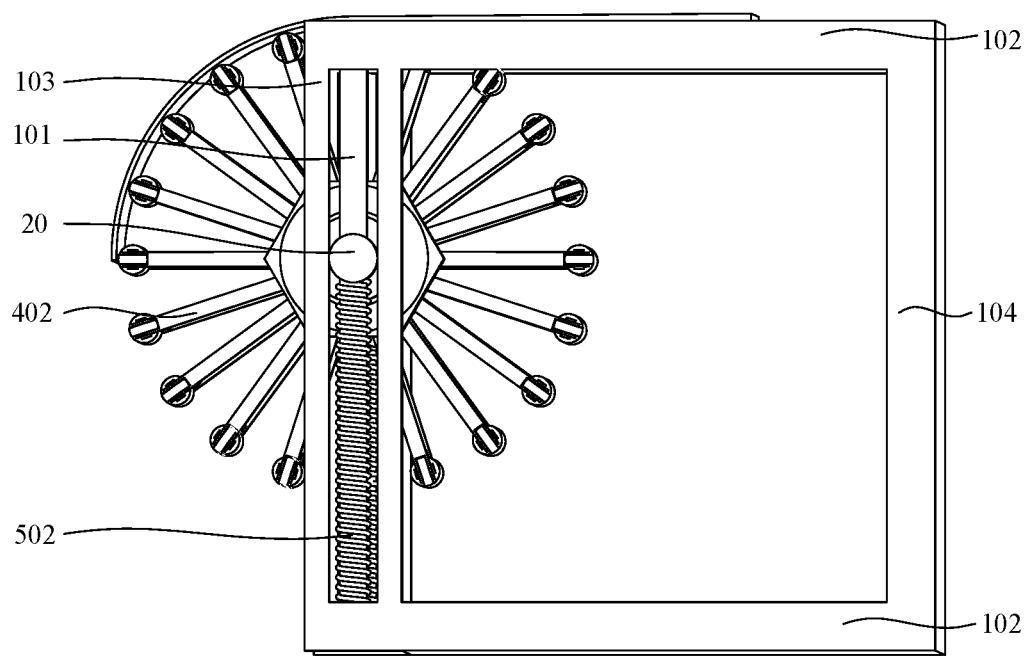
FIG. 8 is a top view of a support device according to an embodiment of the present disclosure.

FIG. 8 is a top view of a support device according to an embodiment of the present disclosure. In combination with FIG. 1 and FIG. 8, the base 10 includes two linear guideways 101, wherein the two ends of the support rod 20 are slidably connected to the linear guideways 101 respectively.

In the embodiments of the present disclosure, because the side face of the contact rod 30 is abutted against the surface of the baffle 501, a maximum distance between the contact rod 30 and the support rod 20 is a maximum distance between the support rod 20 and the baffle 501. In the process of regulating the bending curvature of the support surface, the maximum distance between the contact rod 30 and the support rod 20 is changed, that is, the maximum distance between the support rod 20 and the baffle 501 is also changed. The two linear guideways 101 are disposed, and the support rod 20 is slidably connected to the two linear guideways 101, which is convenient for the support rod 20 to slide, and the maximum distance between the support rod 20 and the baffle 501 is regulated.

The base 10 includes two opposite baseplates 102 and two opposite support plates 103, wherein two ends of the support plate 103 are fixedly connected to the two baseplates 102 respectively, and the two ends of the support rod 20 are connected to the two support plates 103 respectively. In this way, the two baseplates 102 and the two opposite support plates 103 may be connected to form a housing (also known as a frame) with rectangular section. Because the base 10 is the housing with a stable structure, it is convenient to dispose the support rod 20, the plurality of contact rods 30, the regulation structure 40, and the like. It should be noted that the base 10 also may be other shapes as long as a stable support is supplied to the support rod 20.

As illustrated in FIG. 1 and FIG. 8, one of the two opposite baseplates 102 is a baffle 501, and the other of the two opposite baseplates 102 is opposite to the baffle 501, and the two linear guideways 101 are parallel connected between the baseplate 102 and the baffle 501. The support plate 103 is provided with a rectangular through-hole, and the linear guideway 101 is disposed in the rectangular through-hole of the support plate 103, and connected to the inner side walls of the support plate 103, that is, the support rod 20 is connected to the support plate 103 by the linear guideway 101.

In some embodiments, the support rod 20 may be fixedly connected to the support plate 103 directly, that is, the support rod 20 may not slide, and the anti-rotation structure 50 may not be disposed on the support device. During use of the support device, an operator manually fixes the contact rod 30 directly to prevent the contact rod 30 from rotating.

As illustrated in FIG. 1 and FIG. 8, the two ends of the support plate 103 are connected to one of side faces of the baseplate 102, that is, the base 10 is provided with an opening.

As illustrated in FIG. 1 and FIG. 8, the base 10 further includes a side plate 104, and the side plate 104 is connected to the baseplate 102 and the baffle 501, wherein the side plate 104 and the linear guideway 101 are disposed on opposite sides of the baseplate 102.

In the embodiments of the present disclosure, the linear guideway 101 is a fixation rod. Referring to FIG. 2 again, the two ends of the support rod 20 are both provided with through-holes 201 disposed along a length direction of the linear guideway 101. The two fixation rods pass through the two through-holes 201 respectively.

In the embodiments of the present disclosure, the through-hole 201 is disposed on both ends of the support rod 20, and the fixation rod passes through the through-hole 201, such that the support rod 20 is sleeved on the fixation rod. In this way, the support rod 20 slides along the linear guideway 101.

In the embodiments of the present disclosure, the fixation rod is a cylindrical rod, and an inner diameter of the through-hole 201 is greater than an inner diameter of the linear guideway 101, which facilities the sliding movement of the support rod 20.

In some embodiments, the linear guideway 101 is a sliding chute, and the two ends of the support rod 20 are both provided with sliders, wherein the slider is disposed in the sliding chute slidably, such that the support rod 20 is slidably connected to the linear guideway 101.

In some embodiments, the pressing element 502 is disposed on the linear guideway 101, and by supplying the force to one end of the support rod 20, the contact rod 30 is abutted against the surface of the baffle 501 to avoid the rotation of the contact rod 30.

In some embodiments, the pressing element 502 is a second elastic element, wherein the second elastic element is disposed on the linear guideway 101, and the second elastic element is abutted against the support rod 20 and in a state of supplying the pressing force to the abutted support rod 20.

In the embodiments of the present disclosure, the second elastic element is abutted against one end of the support rod 20 such that the support rod 20 is movable towards the baffle 501, and the contact rod 30 is abutted against the surface of the baffle 501 such that the contact rod 30 is prevented from rotating, which is more convenient.

In some embodiments, the second elastic element is a second compression spring in a compressed state, wherein one end of the second compression spring is abutted against one end of the support rod 20, and the other end of the second compression spring is abutted against the baseplate 102, which is more convenient.

In some embodiments, the second elastic element also may be a second spring piece in a compressed state, wherein the second spring piece may supply the pressing force to the hinge ring 401 likewise.

In some embodiments, the side face of a contact rod 30 is abutted against the surface of the baffle 501. In other examples, the side face of two contact rods 30 may be abutted against the surface of the baffle 501.

Figure 9:
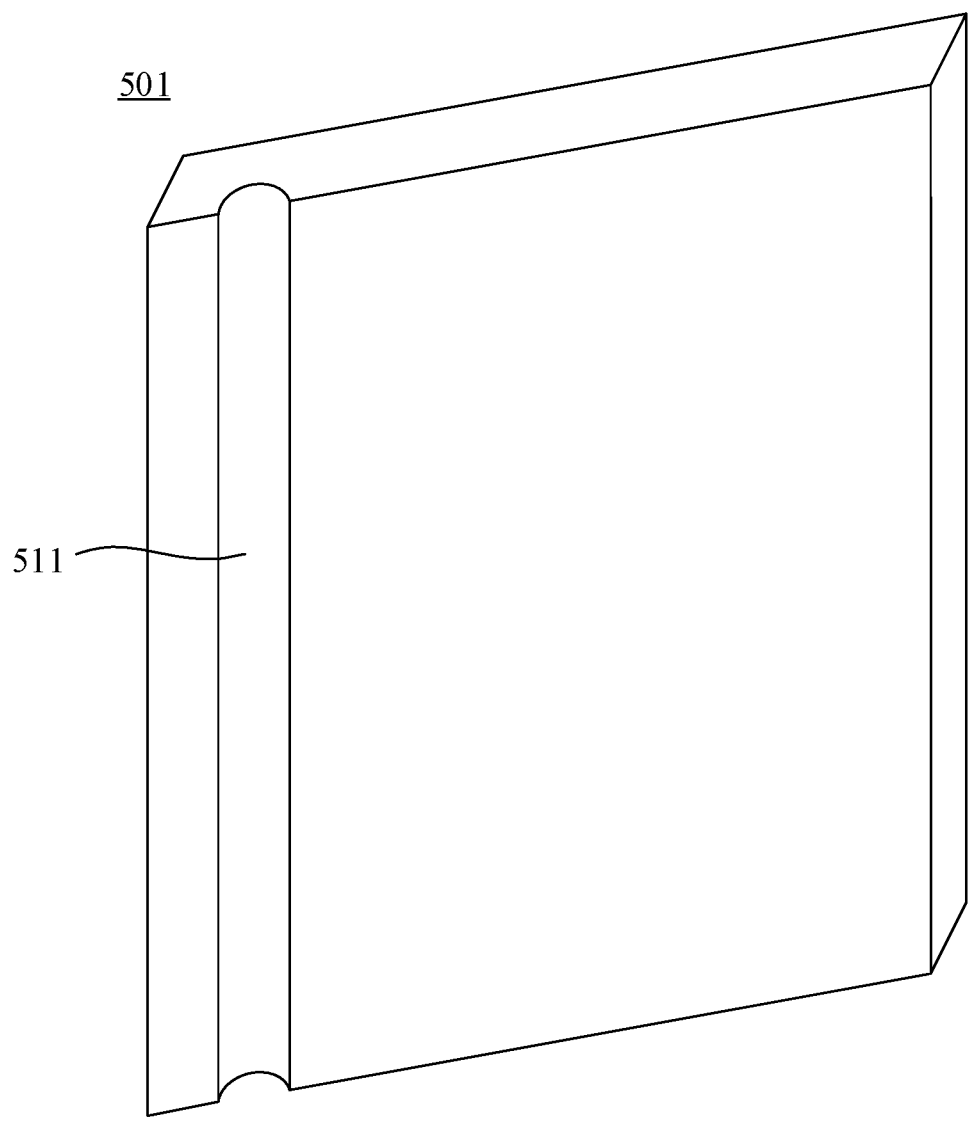
FIG. 9 is a schematic structural diagram of a baffle according to an embodiment of the present disclosure.

FIG. 9 is a schematic structural diagram of a baffle according to an embodiment of the present disclosure. Referring to FIG. 9, the surface of the baffle 501 opposite to the baseplate 102 is provided with a strip-shaped groove 511, wherein an extension direction of the strip-shaped groove 511 is parallel to the length direction of the contact rod 30, and a contact rod 30 is disposed inside the strip-shaped groove 511.

In the embodiments of the present disclosure, the strip-shaped groove 511 is disposed on the surface of the baffle 501, and the contact rod 30 is disposed inside the strip-shaped groove 511, which enhances a limit effect, and preventing the contact 30 from rotating.

As illustrated in FIG. 9, the strip-shaped groove 511 is disposed proximal to a side of the baffle 501, and when the whole support device is produced completely, the strip-shaped groove 511 is opposite to the contact rod 30, such that the contact rod 30 is disposed inside the strip-shaped groove 511, thereby enhancing the limit effect.

In some embodiments, a cross section of the strip-shaped groove 511 is semicircular, and a radius of the semicircle is equal to a radius of the contact rod 30.

Figure 10:
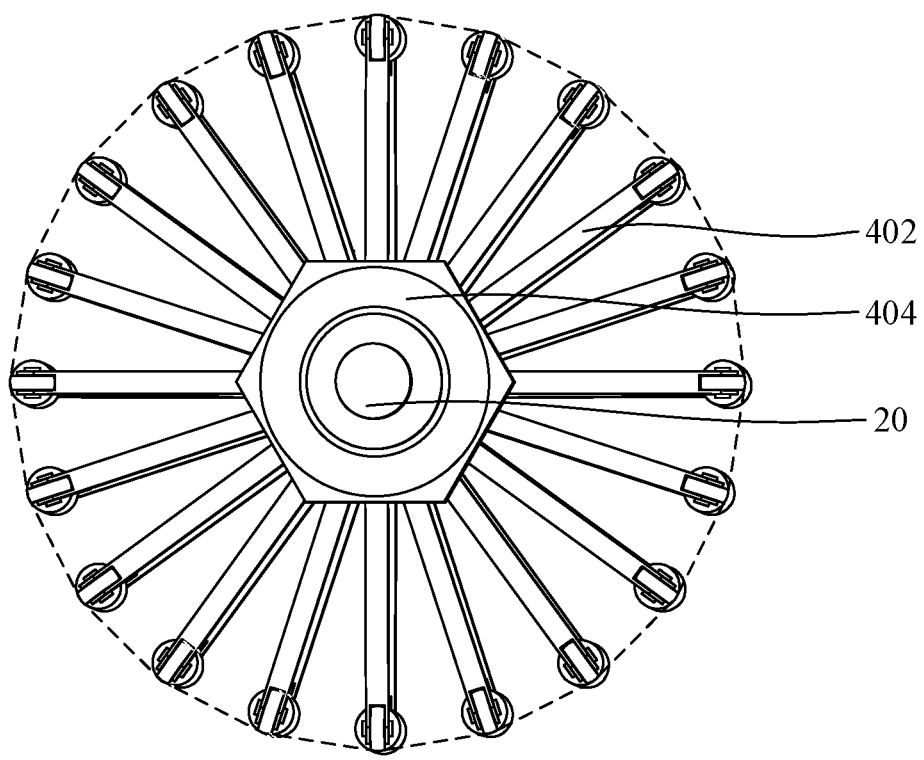
FIG. 10 is a top view of FIG. 2.

FIG. 10 is a top view of FIG. 2. Referring to FIGS. 2 and 10, the plurality of contact rods 30 are equally spaced around the support rod 20 in a circular array.

In the embodiments of the present disclosure, the plurality of contact rods 30 are equally spaced around the support rod 20 in a circular array, ensuring gentleness of the formed support surface. Meanwhile, the support surface formed by the plurality of contact rods 30 is a cylindrical side face. In the process of regulating the bending curvature, as the contact rod 30 rotates, the flexible plate structure 200 may be attached to the support surface all the time, which is more convenient.

In some embodiments, the contact rod 30 may take the central line of the support rod 20 as the central line, and equally spaced apart in a fan array.

As illustrated in FIG. 10, a graph enclosed by side faces of the plurality rods 30 is a polygon. As illustrated in a dotted line in FIG. 10, the greater the number of contact rods 30 is, the more approximate the graph enclosed by the side faces of the contact rods 30 is to the circle.

Figure 11:
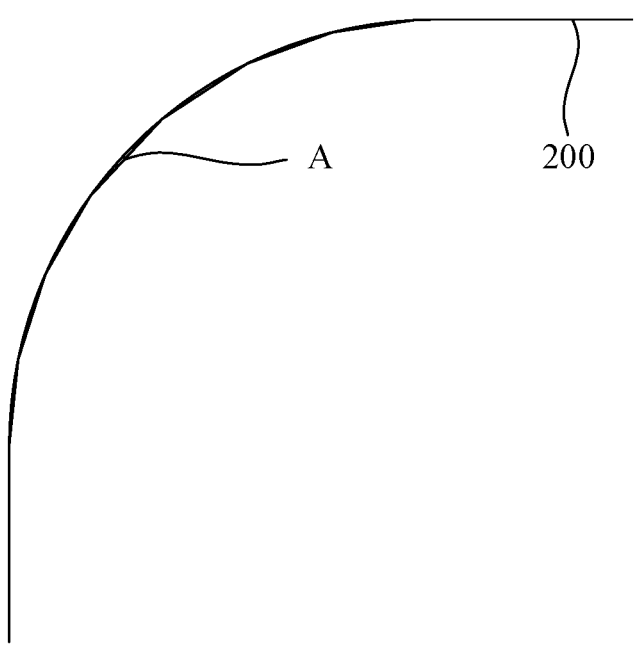
FIG. 11 is a schematic diagram of a flexible plate structure attached to a support surface according to an embodiment of the present disclosure.

FIG. 11 is a schematic diagram of a flexible plate structure attached to a support surface according to an embodiment of the present disclosure. Referring to FIG. 11, the flexible plate structure 200 is attached to the support surface A, such that the flexible plate structure 200 is provided with an arc-shaped bending surface.

In the embodiments of the present disclosure, the number of contact rods 30 is from 15 to 30. By limiting the number of contact rods 30, the support surface formed by the contact rods 30 is approximately arc-shaped, such that the bending of the flexible plate structure 200 on the support surface is approximately arc-shaped, and increasing the accuracy of the subsequent detection results.

Exemplarily, the number of contact rods 30 is 20.

The technical solutions according to the embodiments of the present disclosure achieve at least the following beneficial effects.

The plurality of contact rods 30 are parallel to the support rod 20 and arranged in an arc around the support rod 20, and the side faces of the plurality of contact rods 30 form an approximately arc-shaped support surface to support the flexible plate structure 200. The central line of the support rod 20 is the central line of the support surface, and the sum of the radius of the support rod 20, a minimum distance between the contact rod 30 and the support rod 20, and the diameter of the contact rod 30 is the radius of the support surface. The radius of the support surface is negatively correlated with the bending curvature of the support surface, that is, the greater the radius of the support surface, the smaller the bending curvature of the support surface, and the smaller the radius of the support surface, and the greater the bending curvature of the support surface. Thus, the bending curvature of the support surface may be regulated by regulating the minimum distance between the contact rod 30 and the support rod 20 by the regulation structure 40. In the process of detecting the performance of the flexible plate structure 200 under different bending curvatures, the flexible plate structure 200 is attached to the support surface, and the bending curvature of the support surface is equal to the bending curvature of the flexible plate structure 200. Therefore, in the detection process, a support device may support the flexible plate structure 200 under different bending curvatures, and thus the cost is reduced. Further, in the detection process, it is not necessary to replace the support device, which improve the work efficiency.

Described above are merely optional embodiments of the present disclosure, and are not intended to limit the present disclosure. Any modifications, equivalent substitutions, improvements and the like made within the spirit and principle of the present disclosure shall fall within the protection scope of the present disclosure.

What is claimed is:

1. A support device for a flexible plate structure, comprising:
   a base;
   a support rod, disposed on the base;
   a plurality of contact rods, being parallel to the support rod; wherein the plurality of contact rods are arranged in an arc around the support rod, and side faces of the plurality of contact rods provide a support surface for supporting the flexible plate structure; and
   a regulation structure, connected to the support rod and the contact rod, wherein the regulation structure is configured to regulate a distance between the contact rod and the support rod to regulate a bending curvature of the support surface;

wherein the regulation structure comprises:

two hinge rings, spaced apart on the support rod, wherein at least one of the two hinge rings is configured to be movably disposed on the support rod, and a moving direction of the hinge ring is consistent with a length direction of the support rod;

a plurality of first connection rods in one-to-one correspondence to the plurality of contact rods, wherein one end of the first connection rod is hinged to a corresponding contact rod, and the other end of the first connection rod is hinged to one of the two hinge rings; and a plurality of second connection rods in one-to-one correspondence to the plurality of contact rods, wherein one end of the second connection rod is hinged to a corresponding contact rod, and the other end of the second connection rod is hinged to the other of the two hinge rings.

2. The support device according to claim 1, wherein the two hinge rings are both movably sleeved on the support rod; and the regulation structure further comprises:

two regulation rings, spaced apart on the support rod and threaded to the support rod, wherein the two hinge rings are disposed between the two regulation rings; and a limit element, disposed on the support rod, wherein the limit element is configured to limit a position of the hinge ring on the support rod.

3. The support device according to claim 2, wherein the limit element is a first elastic element, wherein two ends of the first elastic element are abutted against the two hinge rings respectively, and the first elastic element is in a state of supplying a pressing force to the abutted hinge rings.

4. The support device according to claim 1, wherein the two hinge rings are both movably sleeved on the support rod; and the regulation structure comprises:

a telescopic sleeve, sleeved on the support rod, wherein a telescopic direction of the telescopic sleeve is consistent with the length direction of the support rod;

wherein the two hinge rings are fixedly connected to opposite ends of the sleeve respectively.

5. The support device according to claim 1, further comprising:

an anti-rotation structure, disposed on the base, wherein the anti-rotation structure is abutted against the side face of at least one of the contact rods, and the anti-rotation structure is configured to prevent the plurality of contact rods from rotating around the support rod.

6. The support device according to claim 5, wherein the support rod is slidably disposed on the base; and the anti-rotation structure comprises:

a baffle, comprising a surface parallel to a length direction of the contact rod; and a pressing element, configured to limit a position of the support rod on the base, such that the side face of at least one of the contact rods is abutted against the surface of the baffle.

7. The support device according to claim 6, wherein the surface of the baffle is provided with a strip-shaped groove, wherein an extension direction of the strip-shaped groove is parallel to the length direction of the contact rod, and at least one of the contact rods is disposed inside the strip-shaped groove.

8. The support device according to claim 6, wherein the base comprises two parallel linear guideways, wherein two ends of the support rod are slidably connected to the two linear guideways respectively.

9. The support device according to claim 8, wherein the linear guideways are fixation rods, wherein the two ends of the support rod are both provided with a through-hole arranged along a length direction of the linear guideway, and the two fixation rods pass through the two through-holes respectively.

10. The support device according to claim 9, wherein the pressing element is a second elastic element, wherein the second elastic element is disposed on the linear guideway, and the second elastic element is abutted against the support rod, and the second elastic element is in a state of supplying a pressing force to the abutted support rod.

11. The support device according to claim 1, wherein the base comprises two opposite baseplates and two opposite support plates, wherein two ends of the two support plates are fixedly connected to the two baseplates respectively, wherein the two ends of the support rod are connected to the two support plates respectively.

12. The support device according to claim 1, wherein a length of the contact rod is from 5 cm to 10 cm.

13. The support device according to claim 1, wherein the plurality of contact rods are equally spaced around the support rod in a circular array.

14. The support device according to claim 13, wherein a number of the contact rods is from 15 to 30.

15. The support device according to claim 1, further comprising:

an anti-rotation structure, disposed on the base, wherein the anti-rotation structure is abutted against the side face of at least one of the contact rods, and the anti-rotation structure is configured to prevent the plurality of contact rods from rotating around the support rod.

16. The support device according to claim 2, further comprising:

an anti-rotation structure, disposed on the base, wherein the anti-rotation structure is abutted against the side face of at least one of the contact rods, and the anti-rotation structure is configured to prevent the plurality of contact rods from rotating around the support rod.

17. The support device according to claim 3, further comprising:

an anti-rotation structure, disposed on the base, wherein the anti-rotation structure is abutted against the side face of at least one of the contact rods, and the anti-rotation structure is configured to prevent the plurality of contact rods from rotating around the support rod.

18. The support device according to claim 1, wherein the base comprises two opposite baseplates and two opposite support plates, wherein two ends of the two support plates are fixedly connected to the two baseplates respectively, wherein the two ends of the support rod are connected to the two support plates respectively.

19. The support device according to claim 2, wherein the base comprises two opposite baseplates and two opposite support plates, wherein two ends of the two support plates are fixedly connected to the two baseplates respectively, wherein the two ends of the support rod are connected to the two support plates respectively.

* * * * *